United States Patent
Hwang et al.

(10) Patent No.: US 9,577,828 B2
(45) Date of Patent: Feb. 21, 2017

(54) BATCH VERIFICATION METHOD AND APPARATUS THEREOF

(71) Applicant: Electronics and Telecommunications Research Institute, Daejeon (KR)

(72) Inventors: Jung-Yeon Hwang, Daejeon (KR); Sung-Kyong Un, Daejeon (KR); Ku-Young Chang, Daejeon (KR); Hyun-Sook Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/668,566

(22) Filed: Mar. 25, 2015

(65) Prior Publication Data
US 2015/0281256 A1 Oct. 1, 2015

(30) Foreign Application Priority Data
Mar. 27, 2014 (KR) ........................ 10-2014-0036212

(51) Int. Cl.
*H04L 9/30* (2006.01)
*H04L 9/08* (2006.01)
*H04L 9/32* (2006.01)

(52) U.S. Cl.
CPC .......... *H04L 9/3073* (2013.01); *H04L 9/0844* (2013.01); *H04L 9/3013* (2013.01); *H04L 9/3252* (2013.01)

(58) Field of Classification Search
CPC ........ H04L 9/30; H04L 9/3006; H04L 9/3013; H04L 9/3073; H04L 9/3247; H04L 9/3252
See application file for complete search history.

(56) References Cited

U.S. PATENT DOCUMENTS 5,347,581 A * 9/1994 Naccache ............. H04L 9/3252
380/28
5,493,614 A * 2/1996 Chaum ................. H04L 9/3247
380/28

(Continued)

FOREIGN PATENT DOCUMENTS

KR 10-1089121 B1 12/2011

OTHER PUBLICATIONS

Bellare, M., et al, "Fast Batch Verification for Modular Exponentiation and Digital Signatures," Eurocrypt, Jun. 1998, vol. LNCS 1403, pp. 236-250.

*Primary Examiner* — Eric Shepperd
(74) *Attorney, Agent, or Firm* — Nelson Mullins Riley & Scarborough LLP

(57) ABSTRACT

Exemplary embodiments of the present invention relate to a batch verification method for verifying a plurality of authentication data or digital signature values and an apparatus thereof. A batch verification method according to an embodiment of the present invention comprises: rearranging N pairs of individual instances which compose a batch verification instance; selecting N−1 verification exponents from a verification exponent set E which is used for the batch verification; and performing the batch verification for the rearranged batch verification instance by using the selected verification exponents. Exemplary embodiments of the present invention can be suitable for digital signature and cryptographic confirmation. According to exemplary embodiments, verification computation amount of a plurality of authentication data or digital signature values can be significantly reduced.

18 Claims, 2 Drawing Sheets

(56) References Cited

U.S. PATENT DOCUMENTS

| | | | |
|---|---|---|---|
| 7,890,763 B1 | 2/2011 | Law et al. | |
| 2008/0226066 A1* | 9/2008 | Yi | H04L 9/14 380/47 |
| 2008/0320557 A1* | 12/2008 | Hakuta | H04L 9/3281 726/2 |
| 2009/0112956 A1* | 4/2009 | Cheon | G06F 7/724 708/207 |
| 2012/0284508 A1* | 11/2012 | Zaverucha | H04L 9/3263 713/156 |

* cited by examiner

BATCH VERIFICATION METHOD AND APPARATUS THEREOF

CROSS REFERENCE TO RELATED APPLICATION

This application claims priority to and the benefit of Korean Patent Application No. 10-2014-0036212, filed on Mar. 27, 2014, entitled "Batch verification method and apparatus thereof", which is hereby incorporated by reference in its entirety into this application.

BACKGROUND

1. Technical Field

Exemplary embodiments of the present invention relate to a batch verification method and an apparatus thereof for verifying a plurality of authentication data or digital signature values.

2. Description of the Related Art

Computer environment becomes intelligent and a large variety of information has been distributed, collected and processed in a wide area with the development of information communication technology. In addition, message exchanges between devices and environments are often required due to recent convergence phenomenon between different fields. Generally, such messages are transmitted on the public network. Since an attacker can control the network proactively, messages should be properly authenticated to be used correctly and quickly as valid information.

Authentication is defined by a mathematical relation. A verification process determines if generated parameter values satisfy predetermined verification relationship equations in order to provide authentication by a cryptographic protocol or a cryptography.

For example, when a digital signature method using a private signature key and a public verification key corresponding thereto is used, a signature is generated by using a private key having a well defined algebraic relation with a public key. A verifier determines validity of the signature by checking relationship equations defined among a message, a signature and a public key. The verification process involves calculation operations from verification relationship equations.

SUMMARY

Exemplary embodiments of the present invention provide a method for rapidly processing verification of authentication data or digital signature values.

A batch verification method according to an embodiment of the present invention includes rearranging N pairs of individual instances which compose a batch verification instance; selecting N−1 verification exponents from a verification exponent set E which is used for the batch verification; and performing the batch verification for the rearranged batch verification instance by using the selected verification exponents.

A batch verification apparatus includes a processor and a memory, wherein the memory stores a verification exponent set E which is used for batch verification and commands to perform batch verification, wherein the commands comprise commands for the processor, when the commands are executed by the processor, to rearrange N pairs of individual instances which compose a batch verification instance, to select N−1 verification exponents from a verification exponent set E which is used for the batch verification; and to perform the batch verification for the rearranged batch verification instance by using the selected verification exponents.

Exemplary embodiments of the present invention can be applied to a digital signature method and a cryptographic confirmation. According to exemplary embodiments of the present invention, verification computation amount of a plurality of authentication data or digital signature values can be significantly reduced. According to exemplary embodiments of the present invention, unnecessary computation cost for authentication or verification can be reduced due to reduction of the computation amount and can significantly contribute to saving energy in future information technology environment.

According to exemplary embodiments of the present invention, various information can be promptly used as effective information through a rapid authentication process, which thus can significantly improve the efficiency of next generation environment of information & communication technology such as big data, cloud computation and the like.

DESCRIPTION OF THE EXEMPLARY EMBODIMENTS

Figure 1:
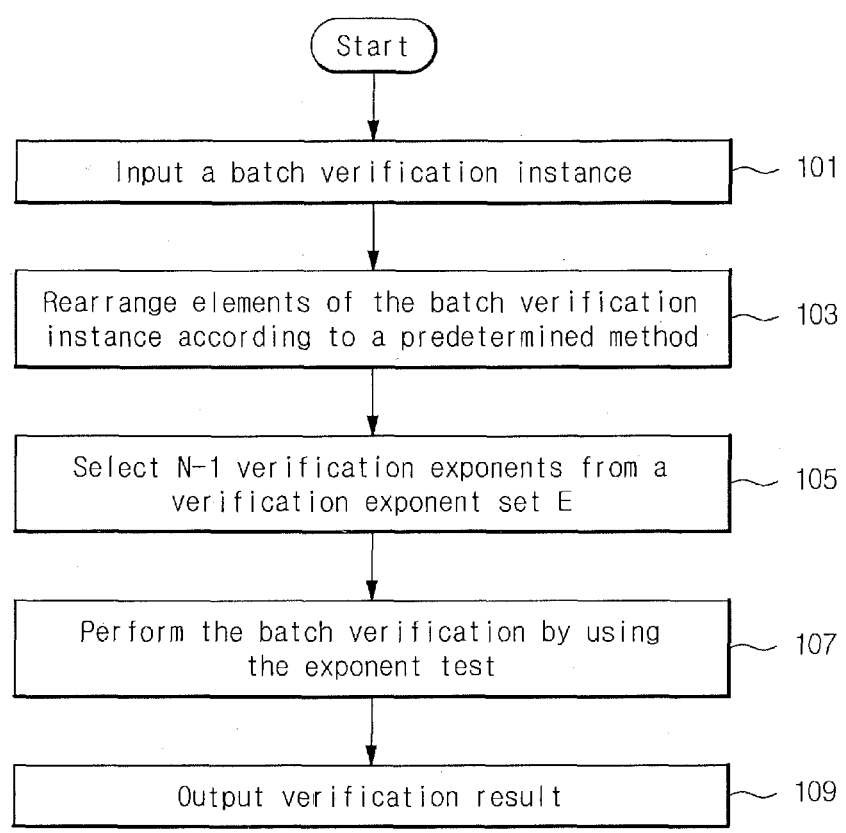
FIG. 1 is a flowchart illustrating a batch verification method according to an embodiment of the present invention.

Throughout the description of the present invention, when describing a certain technology is determined to evade the point of the present invention, the pertinent detailed description will be omitted.

In a recent sophisticated information and communication environment, it is necessary to quickly authenticate and process large-scale messages. Thus, when a verification process can be processed by a compressed method in a view of computation, it provides many advantages. For this, batch verification has been studied. The batch verification can be actually applied to a variety of application fields such as certificate-chain, authentication database, data verification of auction/bid, verification of electronic money (e-money), electronic coin and electronic voting, traffic network message authentication and protocol such as key authenticated among multiparties.

As described above, since verification is defined by a mathematical relation, basic operations such as modular exponentiation are preformed. For example, it is assumed that a multiplicative group G having a prime order p and a generator g of G are given and x is a positive integer from 0 to p−1 and y is an element of G. In this case, when $g^x = y$, it is assumed that a given instance (x, y) is valid. Here, validity verification of the instance (x, y) verifies if it satisfies the equation $g^x = y$.

A small exponent test (SET) is widely known as a basic algorithm of batch verification for modular exponentiation in academia. The SET can be preformed as follows.

For example, it is assumed that a multiplicative group G having a prime order p and a generator g of G are given (even though the group G is an additive group, the same process may be performed). It is also assumed that batch verification instance is given as $\{(x_1, y_1), (x_2, y_2), \ldots, (x_n, y_n)\}$. Here, it is also assumed that $x_i$ is an integer from 0 to p−1 and $y_i$ is an element of G. An object of the SET is to verify if the equation $g^{x_i}=y_i$ satisfies for i. For this, following operation is performed. n verification exponents $(e_1, e_2, \ldots, e_n)$ are selected from the set E of verification exponents with a predetermined small size and it is verified if the following equation is satisfied.

$$g^{x_1e_1+x_2e_2+\ldots+x_ne_n}=y_1^{e_1}y_2^{e_2}\ldots y_n^{e_n}$$

When the SET is used, total computation amount becomes less, compared to individual verification which determines if $g^{x_i}=y_i$ for n instances since a single exponentiation for a compressed single exponent $x=x_1e_1+x_2e_2+\ldots+x_ne_n$ is calculated in the left hand side of the verification equation and a simultaneous multi-exponentiation is used to calculate $y_1^{e_1}y_2^{e_2}\ldots y_n^{e_n}$ in the right hand side. Here, relatively negligible computation amount is required for calculation of the single exponent x.

Various batch verifications known to date have been proposed based on the SET in which n small exponents are randomly selected and used in the batch verification to verify n instances.

It will be very useful if a more efficient method were suggested to additionally reduce the computation amount in the SET.

A SET-based batch verification can be applied to not only standard signature schemes such as digital signature algorithm(DSA), elliptic curve digital signature algorithm (ECDSA) and Korea certification-based digital signature algorithm(KCDSA) but also various digital signature schemes such as privacy protection signature schemes which include an ID-based signature scheme, a group signature and a ring signature. Thus, if a simplified SET which requires less computation amount can be developed, batch verification can be efficiently applied to all of the foregoing signature schemes.

Furthermore, an automated tool to produce a batch verification algorithm based on the SET has been recently known. This tool generates and outputs a batch verification algorithm which provides efficient performance when digital signature is inputted. Thus, such a simplified SET which requires less computation amount is applied to the automated tool for generating a batch verification algorithm it is able to easily improve performance.

The SET shows poor performance, compared with the case that an individual verification is performed multiple times when the size of batch verification instance is small. For example, in case of batch verification to a single instance, since the SET determines if $g^{x_1e_1}=y_1^{e_1}$, while original verification determines if $g^{x_1}=y_1$, performing one individual verification requires less computation amount instead of using the SET. Similar problems are caused in case of batch verification to 2 instances since the SET determines if $g^{x_1e_1+x_2e_2}=y_1^{e_1}y_2^{e_2}$, while original verification determines if $g^{x_1}=y_1$ and $g^{x_2}=y_2$. When a bit of memory can be used and pre-computation is allowed, preforming individual verification twice by using a known fixed-base comb. method which determines if $g^{x_1}=y_1$ and $g^{x_2}=y_2$, is less expensive in terms of computation amount.

Exemplary embodiments of the present invention provide a simplified SET (SSET) to more rapidly perform batch verification, compared to the conventional SET, for verification of a plurality of authentication data or digital signatures.

Exemplary embodiments of the present invention provide a simplified SET using only n−1 exponents for the batch verification of n instances, unlike the conventional SET which uses randomly n instances from a predetermined set E.

In exemplary embodiments of the present invention, a verification exponent set E may be predetermined. The set E may have a specific form to increase calculation efficiency. For example, the set E may be composed simply with small size values or values having small Hamming weight or Hamming distance.

Exemplary embodiments of the present invention can be generally applied regardless of specific algebraic structures, which means that it does not depend on a operation representation of given mathematical group. In other words it can be applied equally by representing differently even though operation of the group is defined with multiplication or addition. For example, it can be applied to all groups such as a finite field multiplicative group, an elliptic curve group represented by addition operation, an integer group and $Z_n=\{0, 1, 2, \ldots, n-1\}$, etc.

Hereinafter, exemplary embodiments of the present invention will be described in more detail with reference to the accompanying drawings.

FIG. 1 is a flowchart illustrating a batch verification method according to an embodiment of the present invention.

In Step 101, a batch verification instance is inputted. The batch verification instance may be a plurality of authentication data or digital signature values for verification.

In Step 103, elements of the batch verification instance which are individual instances are rearranged according to a predetermined method. For example, each individual instance may be uniformly mixed to have a random position.

In Step 105, N−1 verification exponents $(e_1, \ldots, e_{n-1})$ are selected from a verification exponent set E.

The verification exponent set E may be predetermined. The verification exponent set E may have a certain size to be secure against any actual attack for considering the security. For example, the verification exponent set E may be defined as $\{0,1\}^\lambda$ which is a set of all λ-bit-strings. The verification exponent set E may be a set of numbers represented by 0 or 1 for each bit and having a length of λ-bit. Elements $(e_i)$ of the verification exponent set E may have a certain form. For example, elements of the verification exponent set E may have bit representation of which Hamming weight is less than or equal to a predetermined value. For example, elements of the verification exponent set E may be also composed with elements of which Hamming distance is less than or equal to a predetermined value.

In Step 107, the batch verification is performed by using the proposed simplified SET.

In Step 109, verification result is outputted. The verification result is outputted as a result for if the equation used for the batch verification is satisfied or not.

Example 1

When a Fixed Base is Used

It is assumed that a multiplicative group G having a generator g and a prime order p is given. As described above, exemplary embodiments of the present invention is not dependent on operation representation of the given group but can be applied equally by representing differently even though operation of the group is defined with multiplication or addition. However, it is not limited to the multiplicative group. It is assumed that a batch verification instance(D) is given by Equation 1.

$$D=\{(x_1,y_1),(x_2,y_2),\ldots,(x_n,y_n)\} \quad \text{[Equation 1]}$$

wherein, $x_i$ is an integer from 0 to p−1, $y_i$ is an element of the group G. It is assumed that $x_i$ and $x_j$ are different each other and thus satisfy $x_i \neq x_j$. The purpose of the batch verification determines if i satisfies Equation 2 below.

$$g^{x_i} = y_i \qquad \text{[Equation 2]}$$

Elements of the batch verification instance, which are individual instances $(x_i, y_i)$, are rearranged by a predetermined method. For example, each individual instance $(x_1, y_1)$ may be uniformly mixed to have a random position.

The batch verification instance(D) after mixed, without loss of generality, may be represented by Equation 3 below.

$$D = \{(x_1,y_1),(x_2,y_2),\ldots,(x_n,y_n)\} \qquad \text{[Equation 3]}$$

N−1 verification exponents $(e_1, \ldots, e_{n-1})$ are selected from the verification exponent set E.

The batch verification is performed by the exponent test using the selected verification exponents. The batch verification by the exponent test is performed by determining if Equation 4 is satisfied.

$$g^{x_1 + x_2 e_1 + \ldots + x_n e_{n-1}} = y_1 y_2^{e_1} \ldots y_n^{e_{n-1}} \qquad \text{[Equation 4]}$$

wherein, a single exponent (x) for the left hand side may be calculated by Equation 5 below.

$$x = x_1 + x_2 e_1 + \ldots + x_n e_{n-1} \pmod{p} \qquad \text{[Equation 5]}$$

Verification result is outputted. The verification result is outputted as a result for if the equation used for the batch verification is satisfied or not.

The meaning of that the equation is satisfied is that i satisfies the equation $g^{x_i} = y_i$. When the equation is satisfied, '1' may be outputted.

The meaning of that the equation is not satisfied is that i does not satisfy the equation $g^{x_i} = y_i$. In other words, there is i which does not satisfy the equation $g^{x_i} = y_i$. When the equation is not satisfied, '0' may be outputted.

In an embodiment, when the batch verification is performed for a group for which an inverse calculation is easy (e.g., elliptic curve group), the batch verification may be performed by using Equation 6, instead of Equation 4.

$$g^{x_1 + x_2 e_1 + \ldots + x_n e_{n-1}} y_1^{-1} y_2^{-e_1} \ldots y_n^{-e_{n-1}} = 1 \qquad \text{[Equation 6]}$$

In exemplary embodiments of the present invention, n−1 verification exponents $(e_1, \ldots, e_{n-1})$ selected for the verification may be used at random positions instead of used at particular positions. For example, a verification exponent may not be used at the first position as shown in Equation 7, and $$g^{x_1 + x_2 e_1 + \ldots + x_n e_{n-1}} = y_1 y_2^{e_1} \ldots y_n^{e_{n-1}} \qquad \text{[Equation 7]}$$

a verification exponent may not be used at the second position as shown in Equation 8.

$$g^{x_1 e_1 + x_2 + x_3 e_2 + \ldots + x_n e_{n-1}} = y_1^{e_1} y_2 y_3^{e_2} \ldots y_n^{e_{n-1}} \qquad \text{[Equation 8]}$$

It may be the same for other embodiments.

Example 2

When a Variable Base is Used

Unlike the previous embodiments, a case that a base g is not fixed in the validity verification equation of individual instances is provided which determines if an individual instance $(x_i, g_i, y_i)$ satisfies Equation 9 below. In Equation 9, $x_i$ is an integer from 0 to p−1, each of $g_i$ and $y_i$ is an element of the group G.

$$g_i^{x_i} = y_i \qquad \text{[Equation 9]}$$

It is assumed that a batch verification instance(D) is given by Equation 10 and $x_i$ and $x_j$ are different each other.

$$D = \{(x_1,g_1,y_1),(x_2,g_2,y_2),\ldots,(x_n,g_n,y_n)\} \qquad \text{[Equation 10]}$$

Elements of the batch verification instance(D), which are individual instances $(x_i, g_i, y_i)$, provided as input are rearranged by a predetermined method. For example, each position of individual instances is mixed according to uniform distribution. The batch verification instance(D) after mixed, without loss of generality, may be represented by Equation 11 below.

$$D = \{(x_1,g_1,y_1),(x_2,g_2,y_2),\ldots,(x_n,g_n,y_n)\} \qquad \text{[Equation 11]}$$

n−1 verification exponent values $(e_1, \ldots, e_{n-1})$ are selected from the verification exponent set E. The batch verification is performed by the exponent test using the selected verification exponents. The batch verification by the exponent test is performed by determining if Equation 12 is satisfied.

$$g_1^{x_1} g_2^{x_2 e_1} \ldots g_n^{x_n e_{n-1}} = y_1 y_2^{e_1} \ldots y_n^{e_{n-1}} \in G \qquad \text{[Equation 12]}$$

In an embodiment, when the batch verification is performed for a group for which an inverse calculation is easy (e.g., elliptic curve group), the batch verification may be performed by using Equation 13, instead of Equation 12.

$$g_1^{x_1} g_2^{x_2 e_1} \ldots g_n^{x_n e_{n-1}} y_1^{-1} y_2^{-e_1} \ldots y_n^{-e_{n-1}} = 1 \qquad \text{[Equation 13]}$$

Verification result is outputted. The verification result is outputted as a result for if the equation used for the batch verification is satisfied or not.

The meaning of that the equation is satisfied is that i satisfies the equation $g^{x_i} = y_i$. When the equation is satisfied, '1' may be outputted.

The meaning of that the equation is not satisfied is that i does not satisfy the equation $g^{x_i} = y_i$. In other words, there is i which does not satisfy the equation $g^{x_i} = y_i$. When the equation is not satisfied, '0' may be outputted.

n−1 verification exponents $(e_1, \ldots, e_{n-1})$ selected for the verification may be used at any position instead of a particular position.

Example 3

When it is Applied to Digital Signature Algorithm (DSA)

An application method of a simplified SET (SSET) is provided for validity verification equation of more general authentication data or digital signature values.

A validity verification equation of more general authentication data or digital signature values is relatively more complicated. That is, a complicated algebraic relationship equation is used or variable base is used, instead of fixed base. However, in this case, exemplary embodiments of the present invention can be naturally and easily applied. A case of DSA which is the US standard digital signature is considered.

It is assumed that q is a divisor of p−1, wherein the p is a prime. H means a hash function. It is also assumed that a private signature key of a signer is x and a public key is $g^x$ (mod p). The following process is proceeded to generate DSA digital signature values for a message m.

A random number $k \in Z_q$ is first selected and a signature instance is calculated as shown in Equation 14 and Equation 15. H(m) means a hash value of the message and $Z_q$ is $\{0, 1, 2, \ldots, q-1\}$.

$$r=(g^k \bmod p) \bmod q \qquad \text{[Equation 14]}$$

$$s=k^{-1}(H(m)+xr) \bmod q \qquad \text{[Equation 15]}$$

A pair of computed values, (r, s) is defined as the DSA digital signature for the message m.

Meanwhile, the DSA signature instance, (r, s) is verified by determining if it satisfies Equation 16 to Equation 18 given below.

$$u=H(m)s^{-1}(\bmod q) \qquad \text{[Equation 16]}$$

$$v=rs^{-1}(\bmod q) \qquad \text{[Equation 17]}$$

$$W=(g^u y^v \bmod p) \bmod q \qquad \text{[Equation 18]}$$

A verification equation is defined by Equation 19 given below.

$$r=W(=(g^u y^v \bmod p) \bmod q) \qquad \text{[Equation 19]}$$

The verification is determined if it satisfies the equation W=r. If it satisfies the equation, it is outputted that the signature is valid. On the other hand, if it does not satisfy the equation, it is outputted that the signature is not valid.

When several digital signature values of the DSA are verified, the batch verification may be efficiently performed by using the simplified SET (SSET) as follows.

It is assumed that a batch verification instance(D) is given as Equation 20 for the DSA digital signature.

$$D=\{(m_1,r_1,s_1),(m_2,r_2,s_2),\ldots,(m_n,r_n,s_n)\} \qquad \text{[Equation 20]}$$

For the clarity of explanation, it is assumed that each signature value is generated with a different private signature key x, and validity of the signature is verified by using a different public verification key $y_i=g^{x_i}$.

Positions of individual instances $(m_i, r_i, s_i)$ of the batch verification instance(D) provided as input are mixed by a predetermined method. For example, each individual instance may be uniformly mixed to have a random position. The batch verification instance(D) after mixed, without loss of generality, may be represented by Equation 21 below.

$$D=\{(m_1,r_1,s_1),(m_2,r_2,s_2),\ldots,(m_n,r_n,s_n)\} \qquad \text{[Equation 21]}$$

n−1 verification exponents $(e_1, \ldots, e_{n-1})$ are selected from the verification exponent set E. Operations of Equation 22 to Equation 24 are performed.

$$b=H(m_1)s_1^{-1}+e_1 H(m_2)s_2^{-1}+\ldots+e_{n-1}H(m_n)s_n^{-1}(\bmod q) \qquad \text{[Equation 22]}$$

$$d_1=r_1 s_1^{-1} \qquad \text{[Equation 23]}$$

$$d_i=e_i r_i s_i^{-1}(\bmod q)(i=2,3,\ldots,n) \qquad \text{[Equation 24]}$$

The batch verification is performed by determining if Equation 25 is satisfied.

$$r_1 r_2^{e_1} \ldots r_n^{e_{n-1}}=(g^b y_1^{d_1} y_2^{d_2} \ldots y_n^{d_n} \bmod p) \bmod q \qquad \text{[Equation 25]}$$

Verification result is outputted. When the equation is satisfied, '1' may be outputted as the verification result. Otherwise, '0' may be outputted.

In an embodiment, when the batch verification is performed for a group for which an inverse calculation is easy (e.g., elliptic curve group), a modified verification equation using Equation 26 may be used.

$$r_1 r_2^{e_1} \ldots r_n^{e_{n-1}} g^{-b} y_1^{-d_1} y_2^{-d_2} \ldots y_n^{-d_n}=1 \qquad \text{[Equation 26]}$$

As with the previous embodiments, n−1 verification exponents $(e_1, \ldots, e_{n-1})$ selected for the verification may be used at random positions, instead of used at specific positions.

While it has been described with reference to particular embodiments applying the simplified SET (SSET) to the DSA signature, it is to be appreciated that it may be easily applied to various cryptographic batch verifications such as Schnorr digital signature scheme, Sigma-type digital signature scheme, elliptic curve or bilinear map-based signature and proof scheme, group signature, ring signature, proxy signature, ID-based signature, certificateless signature and the like as well as various modifications of the DSA signature.

Participation elements according to the present invention are user devices executing the simplified SET (SSET) which performs the batch verification. User devices may be service providers or service consumers. The device of the present invention may be used as an algorithm outputting a particular value for a given input value. However, participation elements are not limited thereto. Participation elements may be separated or combined flexibly depending on designs or new participation element may be defined if necessary.

Figure 2:
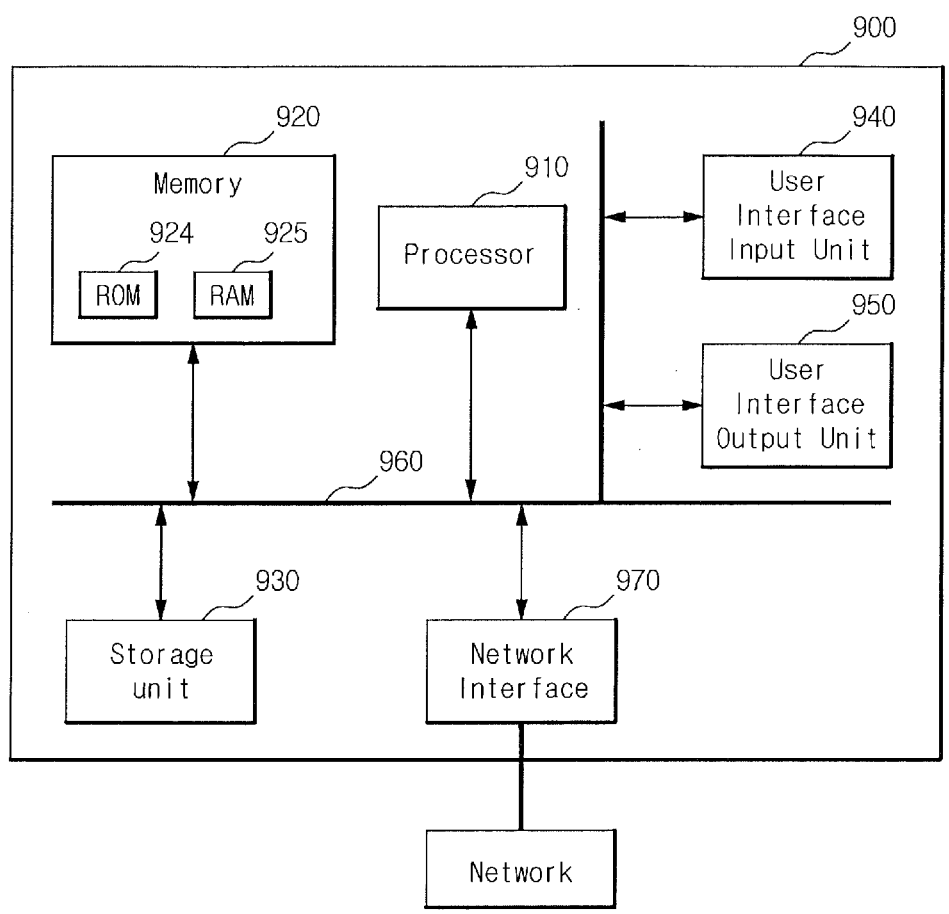
FIG. 2 is a block view illustrating a batch verification apparatus in which exemplary embodiments are applied.

Exemplary embodiments of the present invention may be implemented in a computer system, for example, a computer readable recording medium. As shown in FIG. 2, a computer system 900 may include at least one of at least one processor 910, a memory 920, a storing unit 930, a user interface input unit 940 and a user interface output unit 950 and they may communicate through a bus 960. The computer system 900 may further include a network interface 970 to connect to a network. The processor 910 may be a CPU or semiconductor device which executes processing commands stored in the memory 920 and/or the storing unit 930. The memory 920 and the storing unit 930 may include various types of volatile/non-volatile storage media. For example, the memory may include ROM 924 and RAM 925.

Accordingly, exemplary embodiments of the present invention may be implemented by a method implemented with a computer or by a non-volatile computer recording medium in which computer executable commands are stored. The commands may be performed by at least one embodiment of the present invention when they are executed by the processor.

What is claimed is:

1. A batch verification method comprising:
rearranging N pairs of individual instances which compose a batch verification instance;
selecting N−1 verification exponents from a verification exponent set E which is used for the batch verification; and
performing the batch verification for the rearranged batch verification instance by using an equation having the N−1 selected verification exponents applied thereto,
wherein the equation comprises N elements having a generator or an element of a group G having a prime order p as a base, and
wherein any one of the N elements has none of the N−1 verification exponents applied thereto.

2. The batch verification method of claim 1, wherein the verification exponent set E is a set of lambda($\lambda$) bit-strings.

3. The batch verification method of claim 1, wherein the verification exponent set E is composed with elements whose having a Hamming weight or Hamming distance less than or equal to a predetermined value.

4. The batch verification method of claim 1, wherein the performing the batch verification comprises determining if the batch verification instance satisfies:

$$g^{x1+x2e1+\cdots+xnen-1} = y_1 y_2^{e1} \ldots y_n^{en-1} \in G$$

wherein, g is a generator of a group G having a prime order p, $x_i$ is an integer from 0 to p−1, $y_i$ is an element of G and $e_i$ is an element of E.

5. The batch verification method of claim 1, wherein the performing the batch verification comprises determining if the batch verification instance satisfies:

$$g^{x1+x2e1+\cdots+xnen-1} \cdot y_1^{-1} y_2^{-e1} \ldots y_n^{-en-1} = 1$$

wherein, g is a generator of a group G having a prime order p, $x_i$ is an integer from 0 to p−1, $y_i$ is an element of G and $e_i$ is an element of E.

6. The batch verification method of claim 1, wherein the performing the batch verification comprises determining if the batch verification instance satisfies:

$$g_1^{x1} g_2^{x2e1} \ldots g_n^{xnen-1} = y_1 y_2^{e1} \ldots y_n^{en-1} \in G$$

wherein, each of $g_i$ and $y_i$ is an element of a group G having a prime order p, $x_i$ is an integer from 0 to p−1, $e_i$ is an element of E.

7. The batch verification method of claim 1, wherein the performing the batch verification comprises determining if the batch verification instance satisfies:

$$g_1^{x1} g_2^{x2e1} \ldots g_n^{xnen-1} y_1^{-1} y_2^{-e1} \ldots y_n^{-en-1} = 1$$

wherein, each of $g_i$ and $y_i$ is an element of a group G having a prime order p, $x_i$ is an integer from 0 to p−1, $e_i$ is an element of E.

8. The batch verification method of claim 1, wherein the performing the batch verification comprises determining if the batch verification instance satisfies:

$$r_1 r_2^{e1} \ldots r_n^{en-1} = (g^b y_1^{d1} y_2^{d2} \ldots y_n^{dn} \bmod p) \bmod q$$

wherein, $b = H(m_1)s_1^{-1} + e_1 H(m_2)s_2^{-1} + \ldots + e_{n-1} H(m_n)s_n^{-1}$ (mod q), $d_1 = r_1 s_1^{-1}$, $d_i = e_i r_i s_i^{-1}$ (mod q) (i=2, 3, ..., n), H is a hash function, $(m_i, r_i, s_i)$ is a individual instance pair, $e_i$ is an element of E, g is a generator of a group G having a prime order p, $y_i$ is an element of G and q is a divisor of p−1.

9. The batch verification method of claim 1, wherein the performing the batch verification comprises determining if the batch verification instance satisfies:

$$r_1 r_2^{e1} \ldots r_n^{en-1} g^{-b} y_1^{-d1} y_2^{-d2} \ldots y_n^{-dn} = 1$$

wherein, $b = H(m_1)s_1^{-1} + e_1 H(m_2)s_2^{-1} + \ldots + e_{n-1} H(m_n)s_n^{-1}$ (mod q), $d_1 = e_i r_i s_i^{-1}$ (mod q) (i=2, 3, ..., n), H is a hash function, $(m_i, r_i, s_i)$ is a individual instance pair, $e_i$ is an element of E, g is a generator of a group G having a prime order p, $y_i$ is an element of G and q is a divisor of p−1.

10. A batch verification apparatus comprising a processor and a memory,
wherein the memory stores a verification exponent set E which is used for the batch verification and commands to perform batch verification,
wherein the commands comprise commands for the processor, when the commands are executed by the processor,
to rearrange N pairs of individual instances which compose a batch verification instance,
to select N−1 verification exponents from a verification exponent set E which is used for the batch verification; and
to perform the batch verification for the rearranged batch verification instance by using an equation having the N−1 selected verification exponents applied thereto,
wherein the equation comprises N elements having a generator or an element of a group G having a prime order p as a base, and
wherein any one of the N elements has none of the N−1 verification exponents applied thereto.

11. The batch verification apparatus of claim 10, wherein the verification exponent set E is a set of lambda(λ) bit-strings.

12. The batch verification apparatus of claim 10, wherein the verification exponent set E is composed with elements whose having a Hamming weight or Hamming distance less than or equal to a predetermined value.

13. The batch verification apparatus of claim 10, wherein the commands comprise a command for the processor to perform the batch verification by determining if the batch verification instance satisfies:

$$g^{x1+x2e1+\cdots+xnen-1} = y_1 y_2^{e1} \ldots y_n^{en-1} \in G$$

wherein, g is a generator of a group G having a prime order p, $x_i$ is an integer from 0 to p−1, $y_i$ is an element of G and $e_i$ is an element of E.

14. The batch verification apparatus of claim 10, wherein the commands comprise a command for the processor to perform the batch verification by determining if the batch verification instance satisfies:

$$g^{x1+x2e1+\cdots+xnen-1} \cdot y_1^{-1} y_2^{-e1} \ldots y_n^{-en-1} = 1$$

wherein, g is a generator of a group G having a prime order p, $x_i$ is an integer from 0 to p−1, $y_i$ is an element of G and $e_i$ is an element of E.

15. The batch verification apparatus of claim 10, wherein the commands comprise a command for the processor to perform the batch verification by determining if the batch verification instance satisfies:

$$g_1^{x1} g_2^{x2e1} \ldots g_n^{xnen-1} = y_1 y_2^{e1} \ldots y_n^{en-1} \in G$$

wherein, each of $g_i$ and $y_i$ is an element of a group G having a prime order p, $x_i$ is an integer from 0 to p−1, $e_i$ is an element of E.

16. The batch verification apparatus of claim 10, wherein the commands comprise a command for the processor to perform the batch verification by determining if the batch verification instance satisfies:

$$g_1^{x1} g_2^{x2e1} \ldots g_n^{xnen-1} y_1^{-1} y_2^{-e1} \ldots y_n^{-en-1} = 1$$

wherein, each of $g_i$ and $y_i$ is an element of a group G having a prime order p, $x_i$ is an integer from 0 to p−1, $e_i$ is an element of E.

17. The batch verification apparatus of claim 10, wherein the commands comprise a command for the processor to perform the batch verification by determining if the batch verification instance satisfies:

$$r_1 r_2^{e1} = (g^b y_1^{d1} y_2^{d2} \ldots y_n^{dn} \bmod p) \bmod q$$

wherein, $b = H(m_1)s_1^{-1} + e_1 H(m_2)s_2^{-1} + \ldots + e_{n-1} H(m_n)s_n^{-1}$ (mod q), $d_1 = r_1 s_1^{-1}$, $d_i = e_i r_i s_i^{-1}$ (mod q) (i=2, 3, ..., n), H is a hash function, $(m_i, r_i, s_i)$ is a individual instance pair, $e_i$ is an element of E, g is a generator of a group G having a prime order p, $y_i$ is an element of G and q is a divisor of p−1.

18. The batch verification apparatus of claim 10, wherein the commands comprise a command for the processor to perform the batch verification by determining if the batch verification instance satisfies:

$$r_1 r_2^{e_1} \ldots r_n^{e_{n-1}} g^{-b} y_1^{-d_1} y_2^{-d_2} \ldots y_n^{-d_n} = 1$$

wherein, $b = H(m_1)s_1^{-1} + e_1 H(m_2)s_2^{-1} + \ldots + e_{n-1} H(m_n)s_n^{-1}$ (mod q), $d_i = e_i r_i s_i^{-1}$ (mod q) (i=2, 3, ..., n), H is a hash function, $(m_i, r_i, s_i)$ is a individual instance pair, $e_i$ is an element of E, g is a generator of a group G having a prime order p, $y_i$ is an element of G and q is a divisor of p−1.

* * * * *